(12) United States Patent
Lee et al.

(10) Patent No.: US 8,750,869 B2
(45) Date of Patent: Jun. 10, 2014

(54) HETEROGENEOUS COMMUNICATION SYSTEM AND METHOD FOR PROCESSING CALL IN THE SAME SYSTEM

(75) Inventors: Dong-Hee Lee, Yongin-si (KR);
Jeong-Sick Chang, Suwon-si (KR);
Jin-Woo Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/999,498

(22) Filed: Dec. 4, 2007

(65) Prior Publication Data

US 2008/0153490 A1    Jun. 26, 2008

(30) Foreign Application Priority Data

Dec. 4, 2006    (KR) ........................ 10-2006-0121839

(51) Int. Cl.
*H04W 4/00*    (2009.01)
*H04W 60/00*    (2009.01)

(52) U.S. Cl.
CPC .................................. *H04W 60/00* (2013.01)
USPC ...................................... 455/435.1; 370/354

(58) Field of Classification Search
CPC ... H04W 60/00; H04W 76/007; H04W 8/183; H04W 36/30; H04W 80/04; H04M 3/42042; H04Q 2213/13204
USPC ............ 370/354, 328; 455/435.1, 404.1, 415, 455/432.1, 436
See application file for complete search history.

(56) References Cited

U.S. PATENT DOCUMENTS

2005/0195762 A1*   9/2005 Longoni et al. ................ 370/328
2006/0154665 A1    7/2006 Svensson et al.

FOREIGN PATENT DOCUMENTS

KR    102006011449    11/2006

OTHER PUBLICATIONS

Moo Wan Kim et al., "Experiment of IMS Core Network Enabling Ubiquitous Network", Advanced Communication Technology 2006, 8$^{th}$ International Conference. ICACT, vol. 1, Feb. 2006.
"3rd Generation Partnership Project: Technical Specification Group Services and System Aspects; Voice Call Continuity between CS and IMS Study (Release 7)", 3GPP TR 23.806 V0.2.1, 2005.

* cited by examiner

*Primary Examiner* — Kwasi Karikari
*Assistant Examiner* — Alexander Yi
(74) *Attorney, Agent, or Firm* — The Farrell Law Firm, P.C.

(57) ABSTRACT

A communication system that manages heterogeneous networks including a Circuit Switched (CS) network and an Internet Protocol (IP) Multimedia Subsystem (IMS) network, and a method for processing a voice call in the communication system are provided. When a User Equipment (UE) requests the call setup by sending a Subscribe message including a subscriber identification number to a voice call management server of the IMS network, the voice call management server registers the UE in the IMS network and performs location registration in a Home Location Register (HLR) of the CS network using the subscriber identification number.

8 Claims, 3 Drawing Sheets

HETEROGENEOUS COMMUNICATION SYSTEM AND METHOD FOR PROCESSING CALL IN THE SAME SYSTEM

PRIORITY

This application claims priority under 35 U.S.C. §119(a) to a Korean Patent Application filed in the Korean Intellectual Property Office on Dec. 4, 2006 and assigned Serial No. 2006-121839, the disclosure of which is incorporated herein by reference.

BACKGROUND OF THE INVENTION

1. Field of the Invention

The present invention relates generally to a method and system for processing a voice call in a communication system, and, in particular, to a method and system for processing a voice call in a communication system that manages heterogeneous networks.

2. Description of the Related Art

With the rapid progress of the mobile communication and Internet technologies targeted to meet various needs of the subscribers, the recent mobile communication services have reached the phase of providing not only the existing voice call services but also the high-speed packet data services capable of transmitting high-capacity digital data as well as E-mail and still images via a mobile terminal. Accordingly, the mobile communication systems are evolving from the voice-based Circuit Switched (CS) domain into the packet-based Packet Switched (PS) domain.

The Core Network (CN) that provides multimedia services over the Internet has changed from the existing circuit-based CN into the packet-based CN, and is now evolving into an Internet Protocol (IP)-based CN. A communication system that provides IP Multimedia services (IM services) to the subscribers over the IP-based CN is called an IMS, and third Generation Partnership Project (3GPP)/3GPP2 is conducting various researches to smoothly provide ALL IP services over the IMS.

The IMS is composed of a set of signaling and bearers related to the network elements, and should be able to approach the web-based technology for audio, video and message data, and wireless subscribers. Because the IMS provides various types of packet data services based on an IP transport protocol, the IMS users can exchange multimedia-type contents, such as picture, video clip and sound clip, with each other over Session Based Messages.

The mobile communication systems are now developing into the heterogeneous communication systems that manage heterogeneous networks such as the CS domain and PS domain networks in an integrated way. Herein, the 'PS domain' is also called an 'IMS domain' and the two terms are used interchangeably.

Describing voice call processing in the heterogeneous communication system, Voice Call Continuity (VCC) supports both terminating domain selection between the CS domain and the IMS domain, and IMS-to-CS and CS-to-IMS domain transfer. To this end, all calls of the VCC subscriber are anchored in a VCC Application Server (AS). Therefore, a terminating CS call is anchored in the VCC AS after being rerouted to the IMS domain. All terminating calls incoming from the external network are input to the IMS network via a Media Gateway Control Function (MGCF), and then transmitted to the selected terminating domain via the VCC AS.

Generally, in the heterogeneous communication system, the CS domain and the IMS domain are different in their service providers. Therefore, when the user uses the subscriber identification number, or Mobile Station ISDN Number (MSISDN), that is used in the CS domain, even in the IMS domain, all voice calls are rerouted to the IMS domain after terminating at the CS domain. That is, the IMS domain anchors the corresponding call in the VCC AS, and the VCC AS selects a terminating domain and reroutes the call to the corresponding terminating domain, which unnecessarily performing many procedures.

SUMMARY OF THE INVENTION

An aspect of the present invention addresses at least the problems and/or disadvantages and provides at least the advantages described below. Accordingly, an aspect of the present invention is to provide a method and system for fast processing of a voice call in a heterogeneous communication system that manages a CS domain and an IMS domain.

Another aspect of the present invention is to provide a call processing method and system for sharing subscriber information between mutual domains in a heterogeneous communication system that manages a CS domain and an IMS domain.

According to one aspect of the present invention, there is provided a method for processing a call in a heterogeneous communication system that manages heterogeneous networks including a circuit network and an Internet Protocol (IP) Multimedia Subsystem (IMS) network. The call processing method includes registering a User Equipment (UE) in the IMS network by a voice call management server of the IMS network at the request of the UE; receiving by the voice call management server a subscribe message including a subscriber identification number from the UE; allocating by the voice call management server a transfer number needed by the UE to transfer from the IMS network to the circuit network, in response to the subscribe message, and delivering the transfer number to the UE; and performing, by the voice call management server, location registration for the UE in the circuit network using the subscriber identification number.

According to another aspect of the present invention, there is provided a heterogeneous communication system that manages heterogeneous networks including a circuit network and an Internet Protocol (IP) Multimedia Subsystem (IMS) network. The heterogeneous communication system includes a voice call management server for registering a User Equipment (UE) in the IMS network at the request of the UE, and upon receipt of a subscribe message including a subscriber identification number from the UE, allocating a transfer number needed by the UE to transfer from the IMS network to the circuit network, in response to the subscribe message, delivering the transfer number to the UE, and performing location registration for the UE in the circuit network using the subscriber identification number; and a home location register for performing location registration to the circuit network for the UE at the request of the voice call management server.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
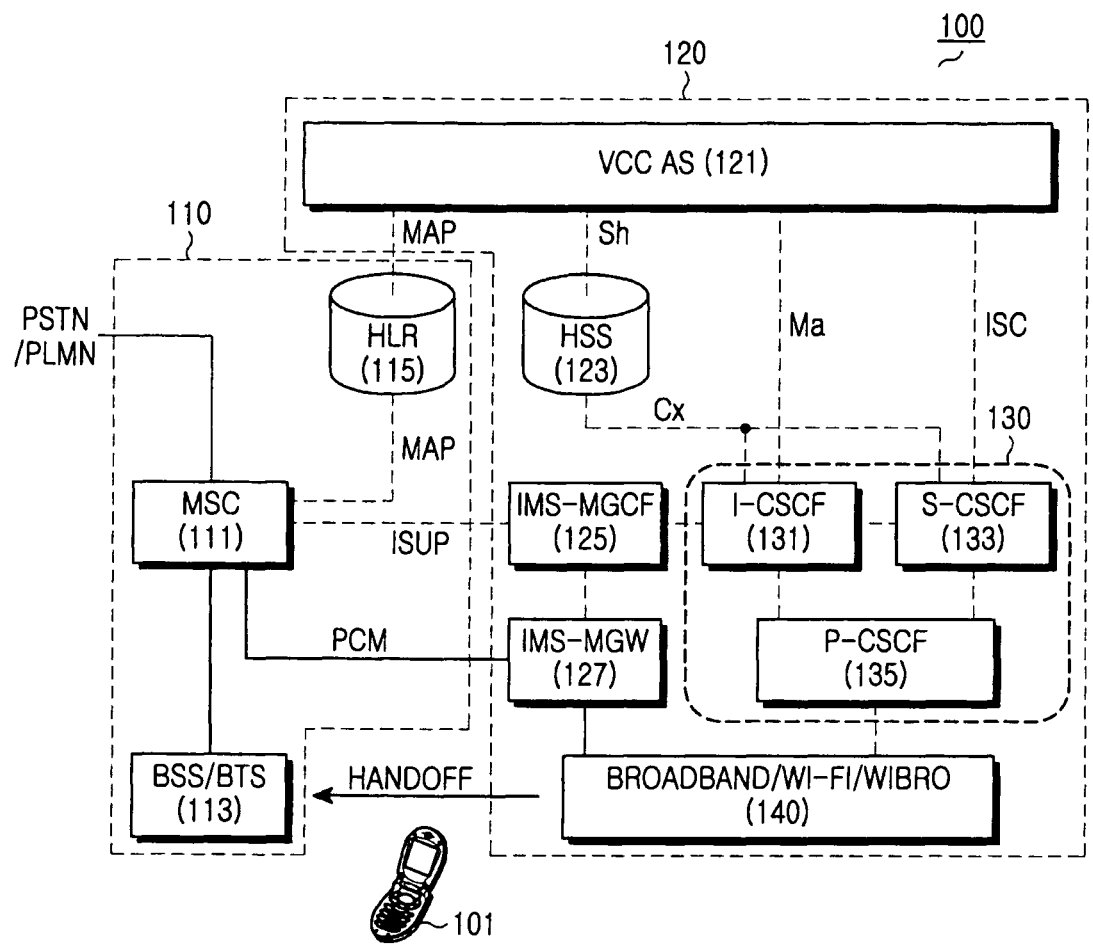
FIG. 1 illustrates a configuration of a heterogeneous communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a system for processing a call by sharing information on a User Equipment (UE) between a Home Location Register (HLR) of a CS domain and a VCC AS of an IMS domain, to efficiently process a terminating call (or incoming call) in a heterogeneous communication system that manages the CS domain and the IMS domain. A description will now be made of a heterogeneous communication system, a location registration method in a UE, and a terminating call processing method according to the present invention.

FIG. 1 illustrates a configuration of a heterogeneous communication system according to an embodiment of the present invention. The terms used in the drawing are defined in 3GPP/3GPP2, as known to those of skill in the art, for conciseness, a separate description thereof is not provided herein.

Referring to FIG. 1, a heterogeneous communication system 100 according to an embodiment of the present invention includes a CS network 110, an IMS network 120, and a UE 101. The IMS network 120 includes a Call Session Control Function (CSCF) 130 for voice call processing, a Home Subscriber Server (HSS) 123 for providing subscriber information, and a VCC AS 121 for taking charge of IMS-to-CS domain transfer.

The UE 101, preferably a dual-mode phone supporting both the CS network 110 and the IMS network 120, supports domain transfer between CS and IMS networks. In addition, the UE 101 supports a Mobility Event Package (MEP) method, which is an information exchange method with the VCC AS 121, and also supports a function in which the user can select an IMS-Only mode according to the user preference. Further, the UE 101 should be able to recognize an IMS deregistration state when leaving the IMS domain, and in this case, the user preference state should change from the IMS Only Mode to the IMS preferred mode.

The VCC AS 121 supports the MEP that exchanges information with the UE 101 immediately after the registration or exchanges information with the UE 101 when the session information changes due to the selection of the operator and the user.

A Serving-CSCF (S-CSCF) 133 takes charge of call setup/release between terminating and originating UEs, and updates service subscriber information (or Service Profile) at the request of the HSS 123 when IMS mode information of the UE 101 is delivered to the VCC AS 121. When an unregistered VCC user (i.e., VCC user unregistered in the IMS) has moved from the IMS domain 120 to the CS domain 110 for the terminating call setup, if another IMS subscriber sends an originating call (or outgoing call) to the VCC user that has moved from the IMS domain to the CS domain, the S-CSCF 133 receives a profile (or unregistered user profile) of the VCC user from the HSS 123, determining that the corresponding VCC user is a VCC user unregistered in the IMS domain depending on an INVITE message of the corresponding call. Thereafter, the S-CSCF 133 forwards the corresponding call to the VCC AS 121 through the profile of the VCC user. Thereafter, the VCC AS 121 reroutes the corresponding call to the CS domain through HLR inquiry.

The HSS 123 stores the service subscriber information. When the IMS-Only mode information is delivered from the user to the VCC AS 121, the HSS 123 updates the service subscriber information at the request of the VCC AS 121. Further, the HSS 123 updates service subscriber information of the S-CSCF 133 by interworking with the S-CSCF 133 via a Cx interface. In addition, the HSS 123 stores the profile of the unregistered VCC user for the originating call setup of the unregistered user.

An HLR 115 manages service subscriber information in the CS domain. Herein, when the subscriber performs IMS registration, recognizing the VCC AS 121 as a logical Mobile Switching Center (MSC), the VCC AS 121 performs subscriber location registration on the HLR 115, like the MSC 111. When a call request is received at the service subscriber, the HLR 115 allows, for the call request, the MSC 111 to which the corresponding subscriber belongs to be allocated a Temporary Local Directory Number (TLDN) which is identification information of a Media Gateway Control Function (MGCF) 125 and a Media Gateway (MGW) 127, to deliver the TLDN to the call-requested MSC 111, achieving the requested call. When the location-registered MSC 111 is the VCC AS 121, the VCC AS 121 allocates and sends an IMS Routing Number (IMRN) other than TLDN, and the call-requesting MSC 111 terminates the corresponding call to the IMS network 120.

A description will now be made of a method for registering VCC subscriber information in the HLR for interworking of subscriber information with the CS domain in the heterogeneous communication system according to an embodiment of the present invention.

Figure 2:
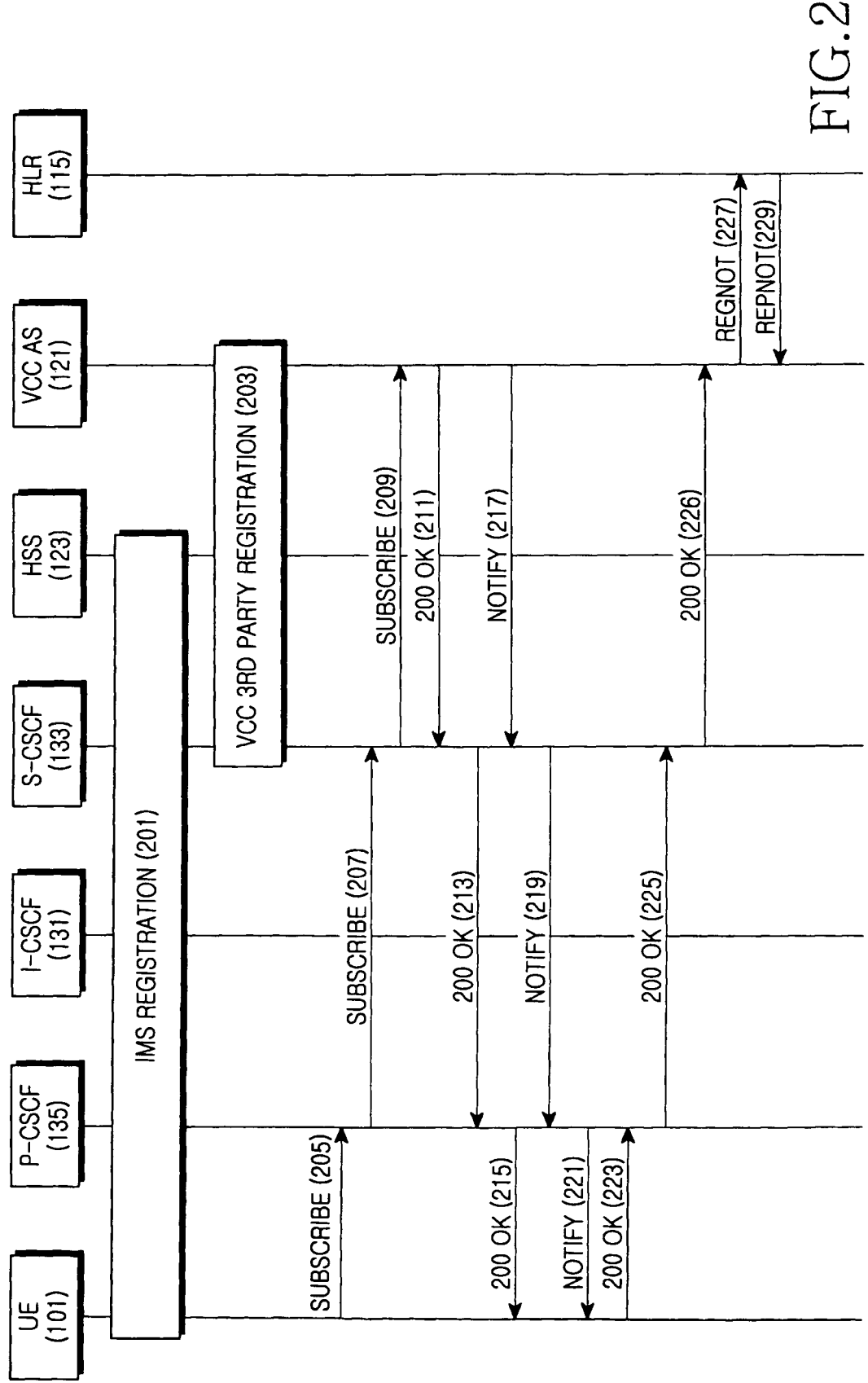
FIG. 2 illustrates an IMS registration method of a VCC subscriber in a heterogeneous communication system according to an embodiment of the present invention.

FIG. 2 illustrates an IMS registration method of a VCC subscriber in a heterogeneous communication system according to an embodiment of the present invention. Herein, the transfer method between the IMS domain and the CS domain will be described based on the 3GPP and 3GPP2 standards.

Referring to FIG. 2, a UE 101 performs a standard IMS registration process with an IMS domain 120 in step 201 for its registration in the IMS domain, and then performs service registration (VCC 3rd Party Registration) of the UE 101 in step 203. Thereafter, the UE 101 sends a request for MEP registration to a VCC AS 121 using an MEP subscribe message, in steps 205 through 209. The subscribe message, providing a unique identification number of a UE used in the CS domain, is sent to the VCC AS 121 along with a Mobile Identification Number/Electronic Serial Number (MIN/ESN) when the UE operates in the Code Division Multiple Access (CDMA) system, and with an International Mobile Subscriber Identity/International Mobile Equipment Identity (IMSI/IMEI) when the UE operates in the Global System for Mobile telecommunication (GSM) system.

Upon receipt of the subscribe message with MIN/ESN or IMSI/IMEI, the VCC AS 121 sends a response message (e.g. a 200 OK message) to the UE 101, in steps 211 to 215. Further, in steps 217 to 219, the VCC AS 121 allocates a VCC Domain Transfer Number (VDTN) to be used when the UE 101 will make domain transfer from the IMS domain 120 to the CS domain 110, and delivers it to the UE 101 using a MEP Notify message, in step 221.

Upon receipt of the Notify message, the UE 101 sends a response message i.e. 200 OK message) to the VCC AS 121 in response thereto, in steps 223 to 226, completing IMS registration.

After completion of the IMS registration, the VCC AS 121 performs location registration in the HLR 115. To this end, the VCC AS 121 sends a Registration Notification (RegNot) message for location registration to the HLR 115 in step 227. Upon receipt of the Request message or the Registration Notification (RegNot) message, the HLR 115 sends a Response message (RepNot) to the VCC AS 121 in response thereto in step 229, completing the location registration process. The location registration by the HLR 115 in steps 227 and 229 uses the MIN/ESN or IMSI/IMEI of the UE 101.

Next, with reference to FIG. 3, a description will be made of a terminating call setup method according to an embodiment of the present invention.

Figure 3:
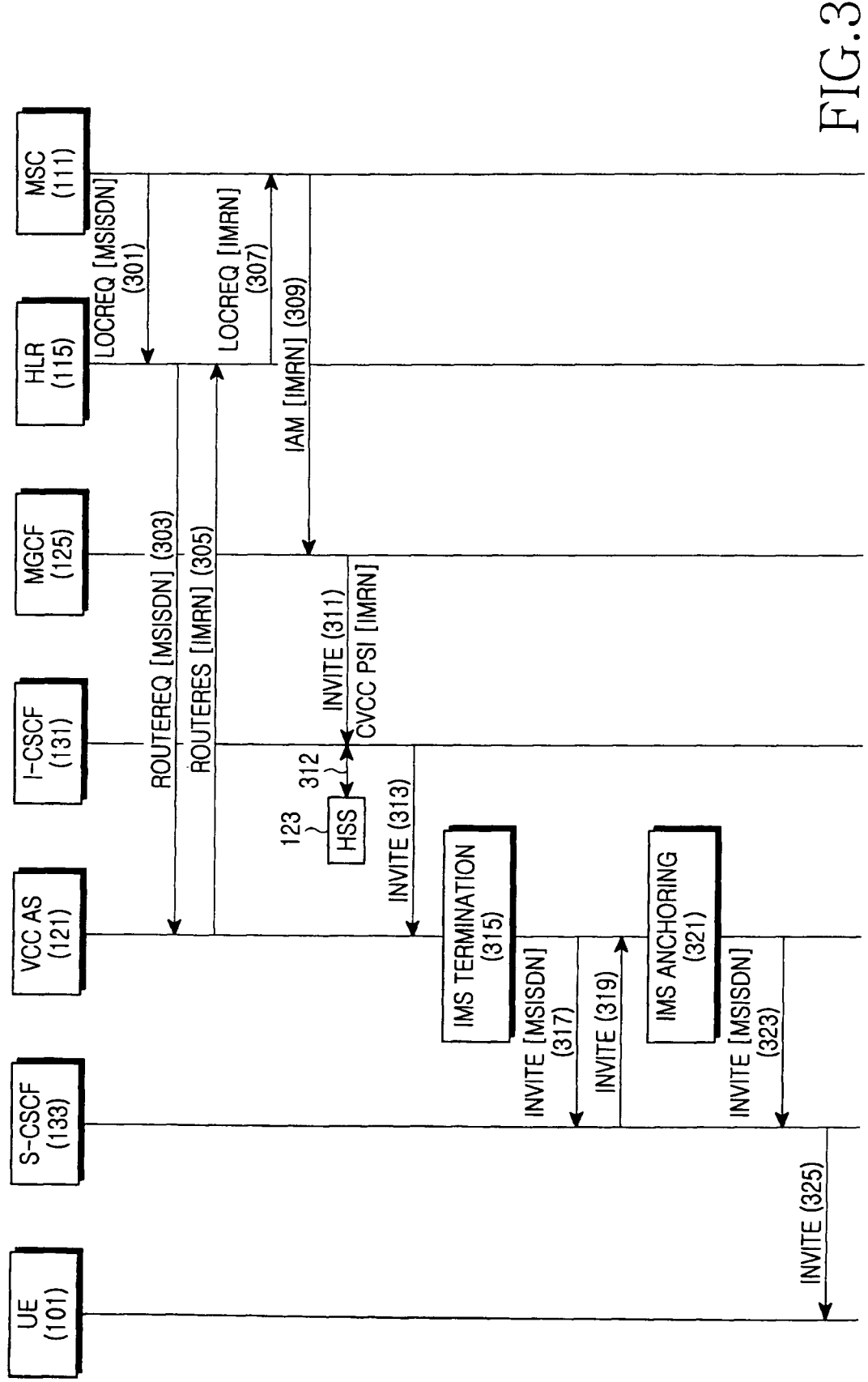
FIG. 3 illustrates a terminating call setup method according to an embodiment of the present invention.

FIG. 3 illustrates a terminating call setup method according to an embodiment of the present invention, and the process shown in FIG. 3 is a process of terminating a terminating call from a CS network to an IMS network.

Referring to FIG. 3, when a terminating call has arrived at an MSC 111 of a CS domain 110 from other network such as Public Switched Telephone Network/Public Land Mobile Network (PSTN/PLMN), the MSC 111 sends a request for call termination information to an HLR 115 using a VCC subscriber number, or Mobile Station ISDN Number (MSISDN), of the terminating UE 101 in step 301. In response, the HLR 115 checks, in step 303, HLR location registration information according to the standard procedure, and then sends a request for location information to the VCC AS 121 in which the terminating UE 101 is now registered. At this point, the VCC AS 121, because it is operating as a logical MSC, allocates an IMRN for the subscriber and returns the allocated IMRN to the HLR 115 in step 305. Upon receipt of the IMRN, the HLR 115 delivers the IMRN to the MSC 111, in step 307. The MSC 111 reroutes the terminating call to the IMS domain 120 using the IMRN received from the HLR 115.

For rerouting, the MSC 111 routes, in step 309, the terminating call to an MGCF 125 of the IMS domain 120 using an Initial Address Message (IAM) including the IMRN. The MGCF 125 sends in step 311 an INVITE message with the IMRN to an Interrogating-CSCF (I-CSCF) 131. Thereafter, the I-CSCF 131 analogizes a VCC AS Public Service Identity (PSI) using the IMRN, and checks an address of the VCC AS from the HSS 123 in step 312. The I-CSCF 131 sends an INVITE message to the corresponding VCC AS 121 in step 313, and the VCC AS 121 performs call termination in step 315.

In step 317, the VCC AS 121 finds a MSISDN number, which is the original VCC subscriber number of the call-requested UE 101, using the IMRN included in the received INVITE message, and sends an INVITE message back to the S-CSCF 133 of the IMS, requesting the call origination.

In step 319, the S-CSCF 133 processes a terminating initial Filter Criteria (iFC) of the subscriber profile for the requested INVITE message, and routes the INVITE message to the VCC AS 121 for anchoring, after determining that the terminating UE 101 is a VCC subscriber.

The VCC AS 121 anchors the call of the terminating UE in step 321, and then performs call termination to the terminating UE 101, in steps 323 and 325.

In the embodiment of the present invention, the termination process from the CS call to the IMS call has been described. However, the call termination to the CS domain does not pass through the VCC AS by using the subscriber information shared between the HLR of the CS network and the VCC AS of the IMS network, as done in the embodiment of the present invention. Therefore, the terminating CS call can be processed according to the normal terminating call processing process. The normal terminating call processing process is known to those skilled in the art, and a detailed description thereof is omitted for conciseness.

As is apparent from the foregoing description, the voice call processing method according to the present invention shares subscriber information between the CS domain and the IMS domain, thereby enabling fast call processing and allowing the UE to perform handoff from the IMS domain to the CS domain. In addition, the terminating call processing between the CS calls does not pass through the IMS domain, facilitating the efficient processing.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for processing a call in a heterogeneous communication system that manages heterogeneous networks including a circuit network and an Internet Protocol (IP) Multimedia Subsystem (IMS) network, the method comprising:

performing Voice Call Continuity (VCC) service registration of a User Equipment (UE) in the IMS network by a voice call management server at a request of the UE supporting both the circuit network and the IMS network;

receiving, by the voice call management server, a subscribe message including a subscriber identification number from the UE by using a Mobility Event Package (MEP) subscribe message;

allocating, by the voice call management server, a transfer number needed by the UE to transfer from the IMS network to the circuit network, in response to the subscribe message, and delivering the transfer number to the UE;

performing, by the voice call management server, location registration for the UE in the circuit network using the subscriber identification number;

allocating, by the voice call management server, a Routing Number (IMRN) in the IMS network for a terminating call, and delivering the IMRN to the circuit network;

receiving, by the voice call management server, the terminating call from the circuit network; and anchoring, by the voice call management server, the terminating call, and delivering the terminating call to the UE corresponding to the IMRN, wherein the voice call management server is a VCC Application Server (VCC AS) and the received terminating call is a terminating call of a VCC subscriber which is determined by initial Filter Criteria (iFC) processing.

2. The method of claim 1, wherein the subscriber identification number is a Mobile Identification Number/Electronic Serial Number or an International Mobile Subscriber Identity/International Mobile Equipment Identity.

3. The method of claim 1, further comprising:

receiving, by the voice call management server, a location information request message of a UE corresponding to the terminating call, from the circuit network that has received the terminating call from an other network other than the IMS network.

4. The method of claim 3, wherein the location information request message includes a Mobile Station ISDN Number indicative of a voice call management server's subscriber number of the UE.

5. A heterogeneous communication system that manages heterogeneous networks including a circuit network and an Internet Protocol (IP) Multimedia Subsystem (IMS) network, the system comprising:

a voice call management server for performing Voice Call Continuity (VCC) service registration of a User Equipment (UE) in the IMS network at the request of the UE supporting both the circuit network and the IMS network and, upon receipt of a subscribe message including a subscriber identification number from the UE through a Mobility Event Package (MEP) subscribe message, allocating a transfer number needed by the UE to transfer from the IMS network to the circuit network in response to the subscribe message, delivering the transfer number to the UE, and performing location registration for the UE in the circuit network using the subscriber identification number; and a home location register for performing location registration to the circuit network for the UE at the request of the voice call management server, wherein the voice call management server allocates a Routing Number (IMRN) in the IMS network for a terminating call, delivers the IMRN to the home location register, receives the terminating call from the home location register, anchors the terminating call, and delivers the terminating call to the UE corresponding to the IMRN, and wherein the voice call management server is a VCC Application Server (VCC AS) and the received terminating call is a terminating call of a VCC subscriber which is determined by initial Filter Criteria (iFC) processing.

6. The heterogeneous communication system of claim 5, wherein the subscriber identification number is a Mobile Identification Number/Electronic Serial Number or an International Mobile Subscriber Identity/International Mobile Equipment Identity.

7. The heterogeneous communication system of claim 5, wherein the voice call management server receives a location information request message of a UE corresponding to the terminating call, from the home location register that has received the terminating call from an other network other than the IMS network.

8. The heterogeneous communication system of claim 7, wherein the location information request message includes a Mobile Station ISDN Number indicative of a voice call management server's subscriber number of the UE.

* * * * *